Dec. 17, 1968  A. L. PAULSON  3,416,510
CAMP STOVE TOASTER
Filed June 27, 1966
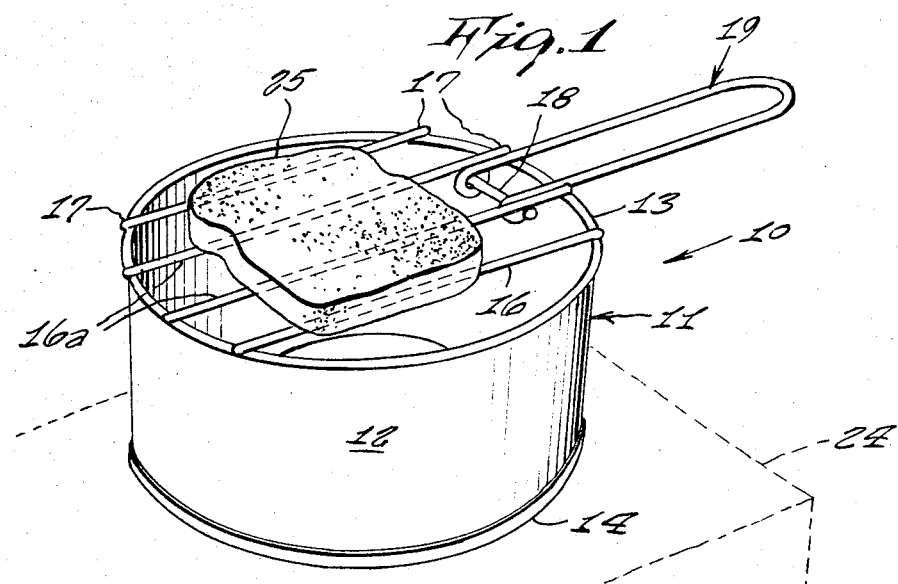
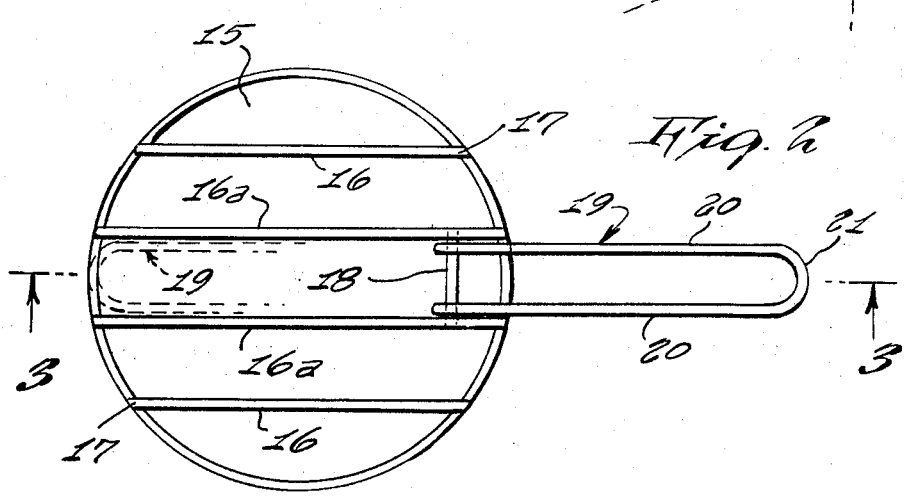
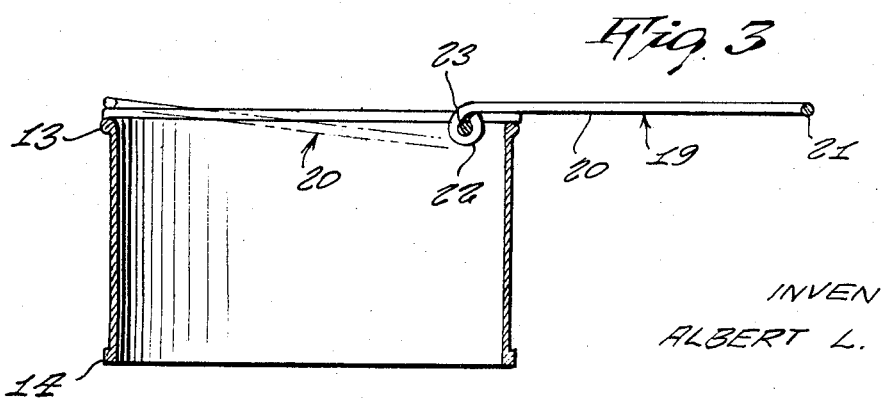
INVENTOR
ALBERT L. PAULSON

United States Patent Office 3,416,510
Patented Dec. 17, 1968

3,416,510
CAMP STOVE TOASTER
Albert L. Paulson, Glen Rte., Aitkin, Minn. 56431
Filed June 27, 1966, Ser. No. 560,497
1 Claim. (Cl. 126—25)

ABSTRACT OF THE DISCLOSURE

A camp stove for cooking out of doors, comprising a cylindrical member having a central opening therethrough, a grill secured across the top thereof, and a handle hingedly secured to the grill, the handle being pivotable between a position adjacent the grill and an extended position for operative use, and the handle being fastened to a pivoted piece traversing two grill bars.

This invention relates generally to camping stove accessories. More specifically it relates to toasters for out of door use.

A principal object of the present invention is to provide a toaster which may be used in conjunction with a camp stove, for the purpose of making toast or heating rolls and buns while picnicing or camping out of doors.

Another object of the present invention is to provide a camp stove toaster having self contained means for producing a toast with an improved flavor due to the toast being made over a charcoal fire. It is well known that charcoal imparts a rich and exclusive flavor to meats and other foods which are barbequed over a charcoal fire. Likewise, it is also known that charcoal adds an improved flavor to costly whiskies filtered through such charcoal. Thus, a toast made over a charcoal fire will likewise acquire an improved flavor.

Another object of the present invention is to provide a camp stove toaster which is readily collapsible for storage when not in use.

Yet another object of the present invention is to provide a camp stove toaster wherein a toast made thereupon is made more evenly toasted than toast made upon conventional toasters.

Other objects of the present invention are to provide a camp stove toaster which is simple in design, inexpensive to manufacture, rugged in construction, easy to use and efficient in operation.

These and other objects will be readily evident upon a study of the following specification and accompanying drawing wherein:

FIGURE 1 is a perspective view of the present invention shown in operative use,

FIGURE 2 is a plan view thereof, and showing the handle in phantom lines in a stored position, and FIGURE 3 is a cross sectional view taken on the lines 3—3 of FIGURE 2.

Referring now to the drawing in detail the numeral 10 represents a camp stove toaster according to the present invention wherein there is a main body member 11 of generally cylindrical configuration having a cylindrical side wall 12 bounded by an upper beaded edge 13 and a lower beaded edge 14, the edges 13 and 14 defining a central opening 15 that extends through the center of member 11.

Upon the upper edge 13 of the member 11, a plurality of bars 16 are placed in parallel relationship, and the ends of the bars as shown at 17, are secured by welding operation to the edge 13 of the cylindrical main body member.

Two of the bars which extend across the central portion of the opening 15, and which are designated with the reference numeral 16a, provides support means for a transverse extending pin 18 secured thereto upon the under side thereof by means of welding. The transverse extending pin 18 provides a support means for a pivotable handle 19 which is moveable between a retracted position as indicated at 20, and an extended position as is indicated by the solid lines in the drawing. The handle 19 is comprised of a singular rod of generally U-shaped configuration having parallel spaced apart legs 20 integrally connected together at their one ends by a U-shaped portion 21, and each of the legs 20 at their opposite terminal ends being bent to form a loop 22 having a central opening 23 into which the pin 18 is inserted so to provide pivotal means of the handle about the pin 18.

In operative use the camp stove toaster is placed upon a camp stove 24 containing a charcoal fire. With the handle 19 in an extended position as shown in FIGURE 1, the device is ready for operative use. A slice of bread 25 is placed across the top of the bars 16, and the under side thereof is toasted. After the underside is finished the bread is turned over upon its opposite side and the toasting operation is completed. The toast is then removed and the device is ready for repeating the toasting operation upon another slice of bread.

While various changes may be made in the detail construction it is understood that such changes will be within the spirit and scope of the present invention as is defined by the appended claim.

I claim:

1. In a camp stove toaster, the combination of a cylindrical main body member, means rigidly affixed upon said main body member for toasting a slice of bread, said main body member comprising an element having a cylindrical side wall, said cylindrical side wall being bounded by an upper beaded edge and a lower beaded edge, said beaded edges defining an opening extending through said cylindrical main body member, said means for toasting a slice of bread comprising a plurality of bars in parallel spaced apart relation to each other secured at their ends upon the said upper edge of the said main body member, two of said bars extending across a central portion of said opening of said main body member having a transverse extending pin therebetween and secured to the underside thereof, a U-shaped handle having parallel spaced apart legs integrally enjoined at their one ends by a semicircular portion, the terminal ends of said legs being each bent to form a loop fitted around said transverse extending pin, said handle being pivotable about said pin, said handle in a retracted position being positioned between said two central bars and said semicircular portion of said handle resting upon said upper edge of said main body member.

References Cited

UNITED STATES PATENTS

| 1,337,524 | 4/1920 | Levy | 126—215 |
| 2,158,236 | 5/1939 | Haislip | 126—25 |
| 2,190,139 | 2/1940 | Stockell | 126—25 |
| 2,417,266 | 3/1947 | Petrakakis | 99—447 |

FREDERICK KETTERER, *Primary Examiner.*

U.S. Cl. X.R.

126—215